(12) United States Patent
Miyazaki

(10) Patent No.: US 7,744,755 B2
(45) Date of Patent: Jun. 29, 2010

(54) BIOLOGICAL TREATMENT AND FILTRATION SYSTEM EQUIPMENT

(76) Inventor: Toyofumi Miyazaki, 1170 Takaoka, Kato-shi, Hyogo 679-0222 (JP)

( * ) Notice: Subject to any disclaimer, the term of this patent is extended or adjusted under 35 U.S.C. 154(b) by 12 days.

(21) Appl. No.: 12/213,108

(22) Filed: Jun. 13, 2008

(65) Prior Publication Data
US 2008/0308479 A1 Dec. 18, 2008

Related U.S. Application Data

(63) Continuation-in-part of application No. PCT/JP2007/061866, filed on Jun. 13, 2007.

(51) Int. Cl.
C02F 9/14 (2006.01)
C02F 3/06 (2006.01)
C02F 1/28 (2006.01)

(52) U.S. Cl. .................... 210/151; 210/262; 210/266; 210/617; 210/631; 210/912

(58) Field of Classification Search ............... 210/150, 210/151, 259, 261, 262, 266, 290, 617, 618, 210/631, 688, 912
See application file for complete search history.

(56) References Cited

U.S. PATENT DOCUMENTS

| 968,015 | A | * | 8/1910 | Wilkie | 210/151 |
|---|---|---|---|---|---|
| 2,355,808 | A | * | 8/1944 | Lawlor | 210/912 |
| 3,933,629 | A | * | 1/1976 | Smith | 210/150 |
| 4,076,616 | A | * | 2/1978 | Verde | 210/618 |
| 4,765,892 | A | * | 8/1988 | Hulbert et al. | 210/290 |
| 4,800,021 | A | * | 1/1989 | Desbos | 210/150 |
| 4,997,568 | A | * | 3/1991 | Vandervelde et al. | 210/150 |
| 5,577,558 | A | * | 11/1996 | Abdul et al. | 210/617 |
| 5,637,210 | A | * | 6/1997 | Vail et al. | 210/150 |
| 6,325,923 | B1 | * | 12/2001 | Zaluski et al. | 210/150 |
| 6,905,603 | B2 | * | 6/2005 | Mirzayi et al. | 210/150 |
| 7,273,556 | B2 | * | 9/2007 | Lefort | 210/912 |
| 2003/0111412 | A1 | * | 6/2003 | Jeong et al. | 210/151 |
| 2004/0109821 | A1 | | 6/2004 | Koyanaka et al. | |
| 2007/0262023 | A1 | | 11/2007 | Reddy | |

FOREIGN PATENT DOCUMENTS

| JP | 57-95209 U | 6/1982 |
|---|---|---|
| JP | 7-308518 A | 11/1995 |
| JP | 8-001147 A | 1/1996 |
| JP | 8-257314 A | 10/1996 |

(Continued)

*Primary Examiner*—Christopher Upton
(74) *Attorney, Agent, or Firm*—Smith Patent Office

(57) ABSTRACT

The present invention provides a biological treatment and filtration system equipment that can reliably remove most of materials harmful to the human body and arsenic components not capable of being removed until now, which are contained in the raw water, by a series of purification operations. A biological treatment and filtration system equipment includes a filter sand layer 111 that treats raw water by microorganism to filter impurities; a raw-water supplying unit 112 that is provided on the upper side of the filter sand layer; an outlet 113 that is provided on the lower side of the filter sand layer and is used to take out filtered water; a filtering net 114 that is detachably held on the upper side of the filter sand layer in a vessel, and includes a net body 114A to which absorbent capable of absorbing arsenic components contained in raw water is adhered, and a frame 114B fixed to an outer periphery of the net body; and a tube (114E) that is provided at an outer portion of the frame and is inflated by pressure fluid so as to seal a gap between the frame and an inner surface of the vessel.

9 Claims, 5 Drawing Sheets

FOREIGN PATENT DOCUMENTS

| | | |
|---|---|---|
| JP | 2001-025611 A | 1/2001 |
| JP | 2003-160338 A | 6/2003 |
| JP | 3546794 B | 4/2004 |
| JP | 2007-505736 A | 3/2007 |

\* cited by examiner

US 7,744,755 B2

BIOLOGICAL TREATMENT AND FILTRATION SYSTEM EQUIPMENT

CROSS REFERENCE TO RELATED APPLICATIONS

This application is a continuation-in-part application of International Application No. PCT/JP2007/061866 filed on Jun. 13, 2007, currently pending.

This application is based on and claims priority to U.S. patent application Ser. No. 12/086,176 filed on Jun. 6, 2008, currently pending, which is the National Stage of International Application No. PCT/JP2007/061866 filed on Jun. 13, 2007 and International Application No. PCT/JP2007/061866 filed on Jun. 13, 2007, the contents of which are hereby incorporated by reference.

BACKGROUND OF THE INVENTION

1. Field of the Invention

The present invention relates to a biological treatment and filtration system equipment for raw water, especially a water to be treated before a drinking water is called a raw water which should be treated to absorb arsenic components and other harmful materials to the human body from raw water.

2. Discussion of the Related Art

As the typical method for preparing a drinking water from raw water, there are generally known a slow filtration method and a rapid filtration method. The former method comprises biological treatment and filtration by sand layers carrying microorganism. The inventors developed the former method and made a new method comprising a filtration by means of very minute sintered sands. The new method is useful in making no drug smell water for drink although a processing speed is not fast [Japanese patent publications tokkaihei 07-308518 and Japanese Patent No. 3406258]

The raw water usually contains impurity and harmful materials before a purify process, so that the harmful materials are filtrated through a filter having a physical small net, but it is difficult to delete arsenic components. The arsenic components exist in a soil in form of variable shapes, so that the raw water containing the arsenic component is sometimes harmful to humans. Therefore, it is recommendable to delete the arsenic components from the drinking water as much as possible.

According to the standard of drinking water, it is requested to lower the content of arsenic to less than 0.01 mg/l. There have been proposed conventional methods for absorbing or cohesively depositing the arsenic components (Japanese Publication 2007-505736 and Japanese Patent No. 3546794).

SUMMARY OF THE INVENTION

In the absorbing method, it has been requested to absorb the arsenic components certainly with ease and change materials to absorb the harmful components smoothly and promptly when the materials are saturated with the harmful components. Therefore, the object of the present invention is to provide a biological treatment and filtration system equipment to complete the above conventional requests.

According to a first aspect of the present invention, there is provided a biological treatment and filtration system equipment for raw water, which comprises 1) a water treating vessel provided with a raw water inlet and a treated water outlet; 2) a filter sand layer provided between the inlet and the outlet in the vessel for filtering and biologically treating the raw water with a sand layer containing at least very minute sintered sands carrying microorganism; 3) a filtering net provided on the top of said filter sand layer, comprising a net body carrying absorbent for absorbing arsenic components contained in the raw water and a frame fixed to periphery of said net body, wherein a tube ring is engaged on the periphery of the frame of filtering net in a manner to bulge out by a pressure fluid supplied thereto until contacting to a inner surface of the vessel to make a sealing off between the frame and the inner surface.

According to the present invention, the net body can make a sealing off between the frame and the inner surface with ease by supplying a pressure fluid to the tube ring engaged on the periphery of the frame of filtering net, so that the arsenic components contained in the raw water cannot be passed through the net body and is easy to be withdrawn from the vessel when necessary to be changed since the sealing off made by the tube ring can be released by discharging a pressure fluid from the tube ring.

In a preferred embodiment, the net body is made of the very minute mesh net in order to trap the arsenic components absolutely. Especially it is more preferable to make the net body from stainless steel (for example SUS304) wire screen having a mesh in a range of 0.053 mm to 0.283 mm.

The materials to absorb the arsenic components can selected from the absorbing agent group consisting of active carbon, active alumina, zeolite, titanate compound, zirconium hydroxide and so on. Especially, it is more preferable to use manganese oxide since it can absorb trivalent arsenic component as well as 5-valent arsenic component and harmful components such as manganese or iron component (as shown in Japanese Publication Tokkai 2003-160338).

The net filter can be supported in the vessel by the tube ring bulged out. It is more preferable to suspend the filter net from a top periphery end of the vessel by means of an attachment bracket.

We can use a conventional sintered sand layer as the filter sand layer. In a preferred embodiment, the filter sand layer may comprise a first layer comprising very minute sintered sands having an average diameter in a range of 0.08-0.3 mm, a second layer comprising sintered sands having an average diameter in a range of 0.4-1.8 mm, and a third layer comprising ballasts and cobble stone having an average diameter in a range of 2-20 mm. The organic impurity, various kinds of minor germs and so on can be omitted from the sands by sintering process. The resulting water has good Turbidity of less than 30 obtained according to Turbidity test JWWA A103-1988.

In order to improve the turbidity it is important to decompose and decrease sludge on the surface of sands. Therefore, there is provided a filter sands washer for spraying water which comprises a holder and a washer nozzle fixed to the holder between the filter sands layer and the filtering net.

In order to improve decomposition of sludge, it is desirable to provide an aeration device comprising a holder and an air nozzle fixed to the holder between the filter sands layer and the filtering net to discharge air to microorganism carried on the filter sand layer.

It is preferable to mount the air nozzle of the aeration device on the holder of the filter sand washer.

Figure 1:
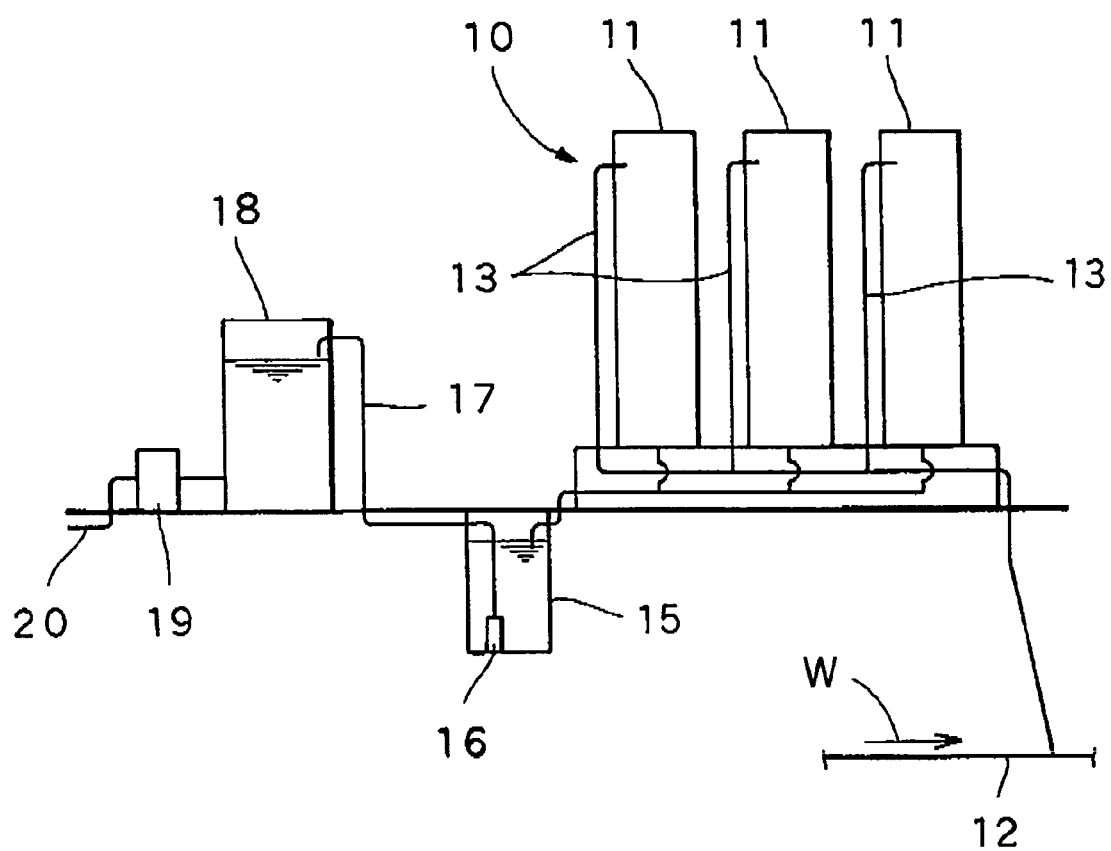
FIG. 1 is a view showing the entire structure of a filtration facility that includes biological treatment and filtration system equipment according to a preferred embodiment of the invention.
Figure 2:
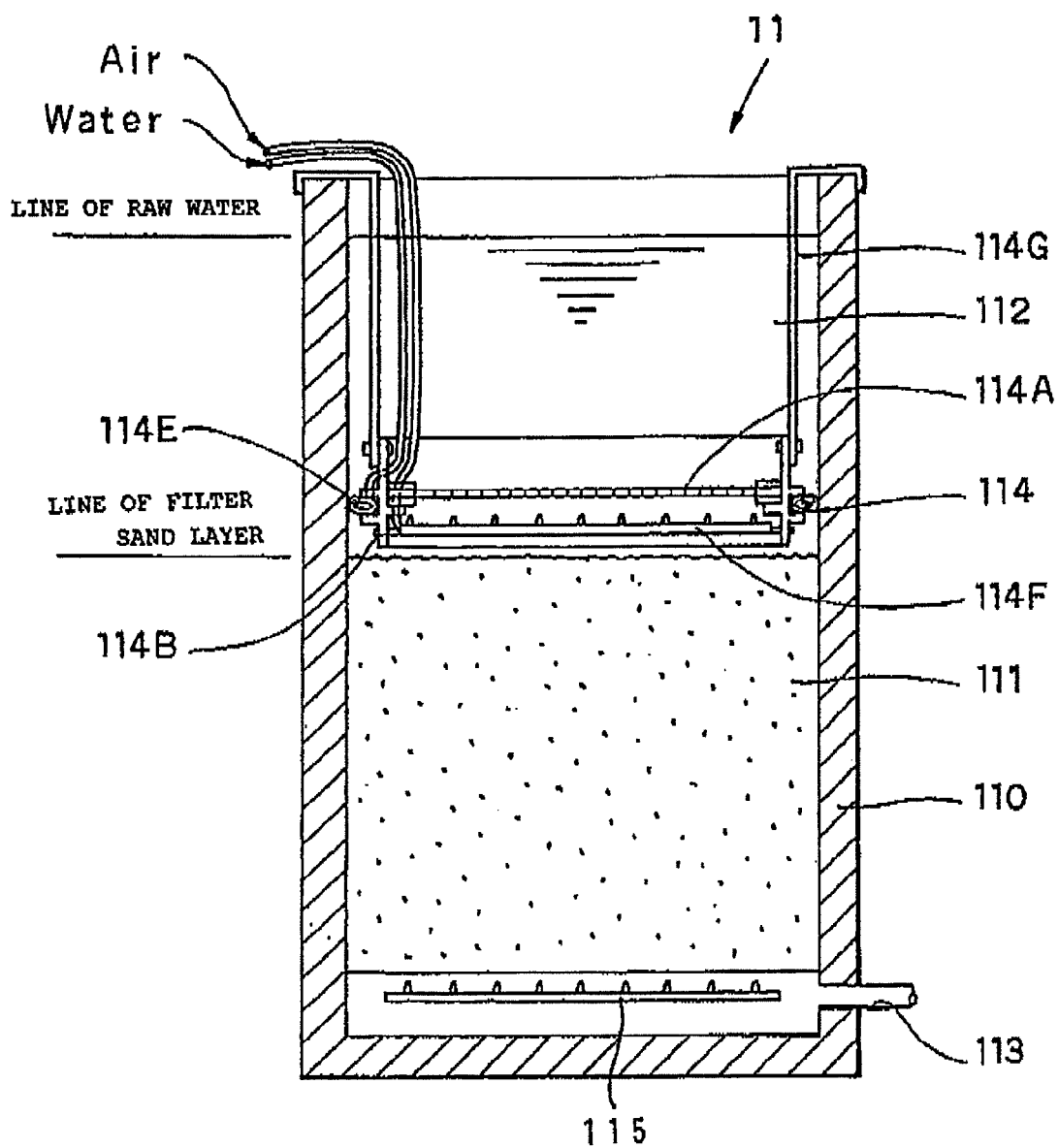
FIG. 2 is a schematic cross-sectional view of the embodiment.

11: BIOLOGICAL TREATMENT AND FILTRATION SYSTEM EQUIPMENT
110: VESSEL
111: FILTER SAND LAYER
112: RAW-WATER SUPPLYING UNIT
113: OUTLET
114: FILTERING NET
114A: NET BODY
114B: FRAME
114E: RUBBER TUBE
114G: FIXING CLASP

THE PREFERRED EMBODIMENTS OF THE INVENTION

Embodiments of the invention will be described in detail below with reference to drawings. FIGS. 1 to 4 show a biological treatment and filtration system equipment according to a preferred embodiment of the invention. In the drawings, a filtration facility 10 is provided with a plurality of, for example, three biological treatment and filtration system equipments 11. Raw water W is supplied to the upper portion of each of the three biological treatment and filtration system equipments 11 by a raw water supply pipe 13 that is branched from an existing pipe 12 that supplies groundwater (raw water) W.

A take-out pipe 14, which takes out filtered water (drinking water), is connected to the biological treatment and filtration system equipment 11. The take-out pipe 14 is connected to a provisional water tank 15, a water-supply pump 16 is provided in the provisional water tank 15, a water-supply pipe 17 is connected to the water-supply pump 16, the water-supply pipe 17 is connected to a main water tank 18, and drinking water in the main water tank 18 is supplied to a predetermined location by a booster pump 19 and a water pipe 20.

The biological treatment and filtration system equipment 11 is provided with a vessel 110. The vessel 110 has, for example, a bottomed cylindrical shape that has a height of 2000 mm and an inner diameter of 800 mm, and an upper opening is closed by a lid (not shown).

A filter sand layer 111 is provided at a lower half portion in the vessel 110. A raw-water supplying unit 112, which receives and temporarily stores raw water and then supplies the raw water to the filter sand layer 111, is provided on the upper side of the filter sand layer 111. A reverse washing device 115 is provided on the lower side of the filter sand layer 111. An outlet 113 through which filtered water is taken out is formed on the wall of the vessel 110, and the take-out pipe 14 is connected to the outlet 113.

Figure 3:
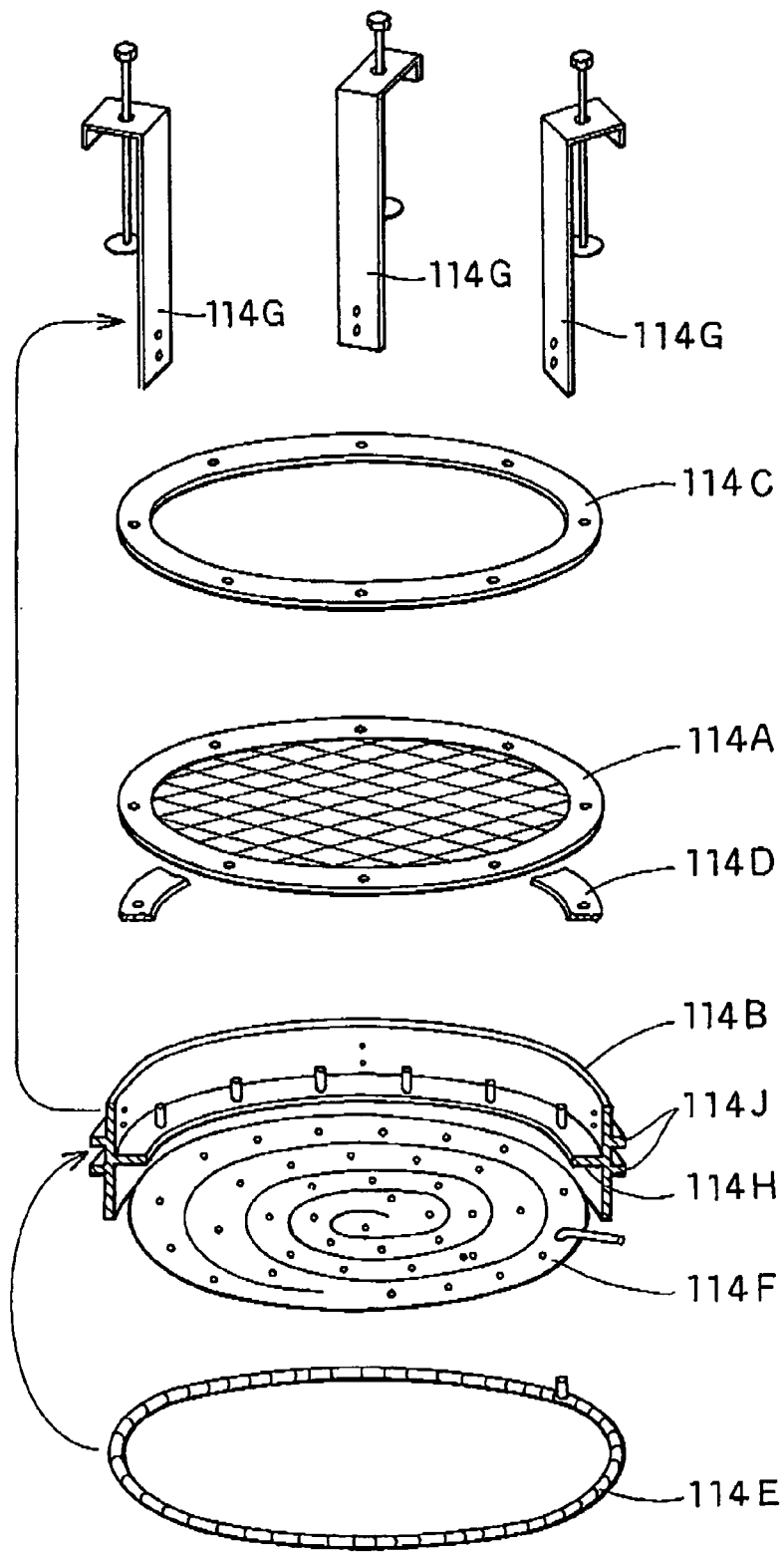
FIG. 3 is a sectional perspective view of main parts of the embodiment.

A filtering net 114 is built in the raw-water supplying unit 112 of the vessel 110 built. As shown in FIG. 3, in the filtering net 114, a net body 114A is formed of a wire screen having 200 mesh, that is, a mesh of 0.076 mm using, for example, a stainless steel wire having a diameter of 0.051 mm. Absorbent, for example, fine particles of a manganese dioxide are adhered to the wire of the wire screen.

The net body 114A is mounted on a middle receiving surface 114H of a short cylindrical frame 114B with brackets 114D interposed therebetween, and is pressed from above. A bracket 114C overlaps the net body, and is tightened and fixed by bolts and nuts. A reverse washing pipe 114F is disposed below the middle receiving surface 114H of the frame 114B, and the reverse washing pipe 114F is connected to an external supply source (not shown) for supplying treated reverse washing water. Accordingly, the treated reverse washing water is supplied, so that the net body 114A can be reversely washed.

Fixing flanges 114J are formed on the outer peripheral surface of the frame 114B with a gap therebetween in a vertical direction. An elastic tube, for example, a rubber tube 114E is fitted between the fixing flanges 114J. Air is supplied to the rubber tube 114E from an external air supply source (not shown), so that the rubber tube 114E is inflated and seals a gap between the frame 114B and an inner surface of the vessel 110.

Further, lower ends of fixing clasp 114G are fixed to the frame 114B and the fixing clasps 114G are detachably fixed to the top periphery end of the vessel 110, so that the net body 114A and the frame 114B are suspended and supported.

Figure 4:
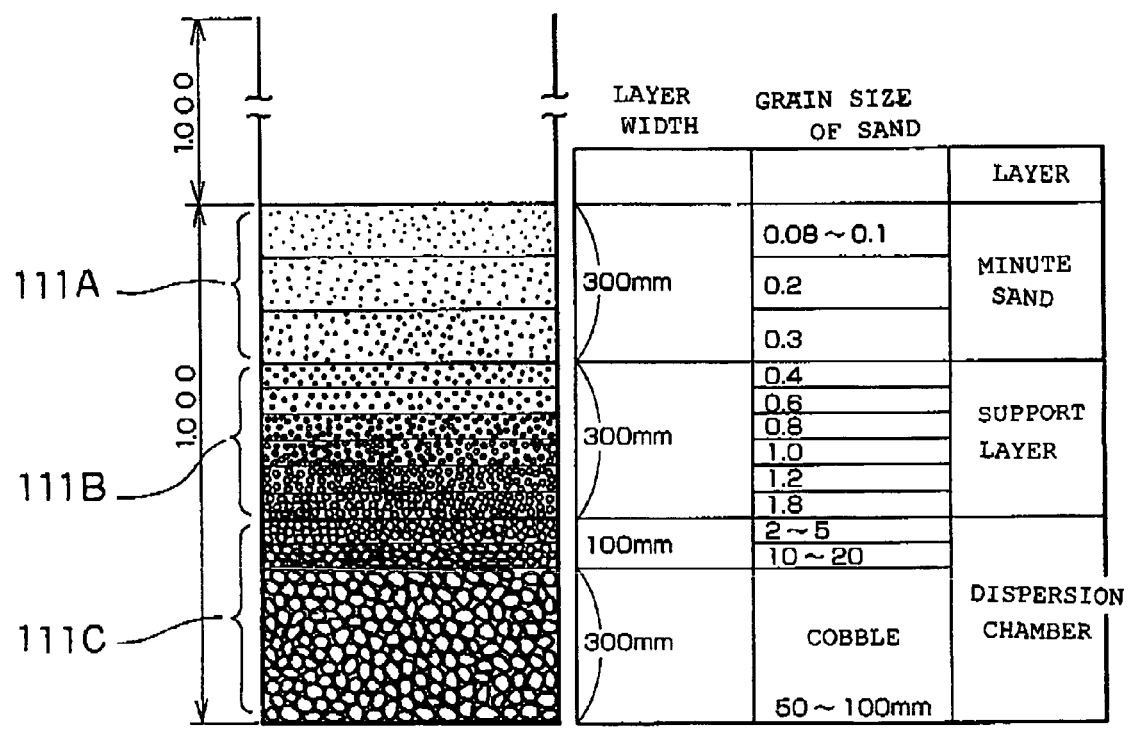
FIG. 4 is a view showing the structure of a filter sand layer of the embodiment.

As shown in FIG. 4, the filter sand layer 111 includes a first layer 111A that has very minute sintered sands having an average diameter in a range of 0.08 to 0.3 mm, a second layer 111B that is provided below the first layer 111A having very minute sintered sands and has minute sintered sands having an average diameter in a range of 0.4 to 1.8 mm, and a third layer 111C that is provided below the second layer 111B having minute sintered sands and has ballasts and cobble stone having an average diameter in a range of 2 to 20 mm. The first layer 111A having very minute sintered sands, the second layer 111B having minute sintered sands, and the third layer 111C are wrapped with filtration cloth, for example, silk clothes, if necessary.

When raw water is received in the raw-water supplying unit 112, the raw water is downward supplied to the filter sand layer 111 provided on the lower side due to its own weight, so that the raw water is treated by microorganisms attached to the surface of the filter sand layer 111. When the raw water passes through the filter sand layer 111, impurities are filtered and filtered water is taken out through the outlet 113.

In this case, in the filtering net 114, materials harmful to the human body, such as manganese components or iron components, contained in the raw water are absorbed in a manganese dioxide of the net body 114A, and arsenic components are absorbed in the manganese dioxide and the manganese components. Therefore, the arsenic components and the harmful materials contained in the raw water are reliably removed.

According to experiments of the present inventors, it was confirmed that the content of arsenic of the treated drinking water under the standard of drinking water could be less than 0.01 mg/l and the arsenic components and the materials harmful to the human body was absorbed in the net body 114A in the form of frost.

If the amount of materials absorbed in the filtering net 114 is increased and absorption performance deteriorates, the moderate amount of treated reverse washing water is supplied to perform the reverse washing of the net body 114A. Accordingly, absorbed components are separated from the net body 114A and dispersed, so that the components are dispersed over the entire net body 114A and absorbed. As a result, it is possible to restore absorption performance.

When the amount of absorbed materials of the filtering net 114 is saturated, the supply of air is stopped so that the rubber tube 114E is deflated. Then, if the fixing clasps 114G are released and lifted, it is possible to lift the filtering net 114 from the vessel 110. Therefore, if a new filtering net 114 is set in the vessel 110 and air is supplied to the rubber tube 114E so that the rubber tube 114E is inflated, it is possible to seal a gap between the frame 114B of the filtering net 114 and the vessel 110 and arsenic components and harmful materials are not supplied to the filter sand layer 111 through the gap between the frame 114B of the filtering net 114 and the vessel 110.

Figure 5:
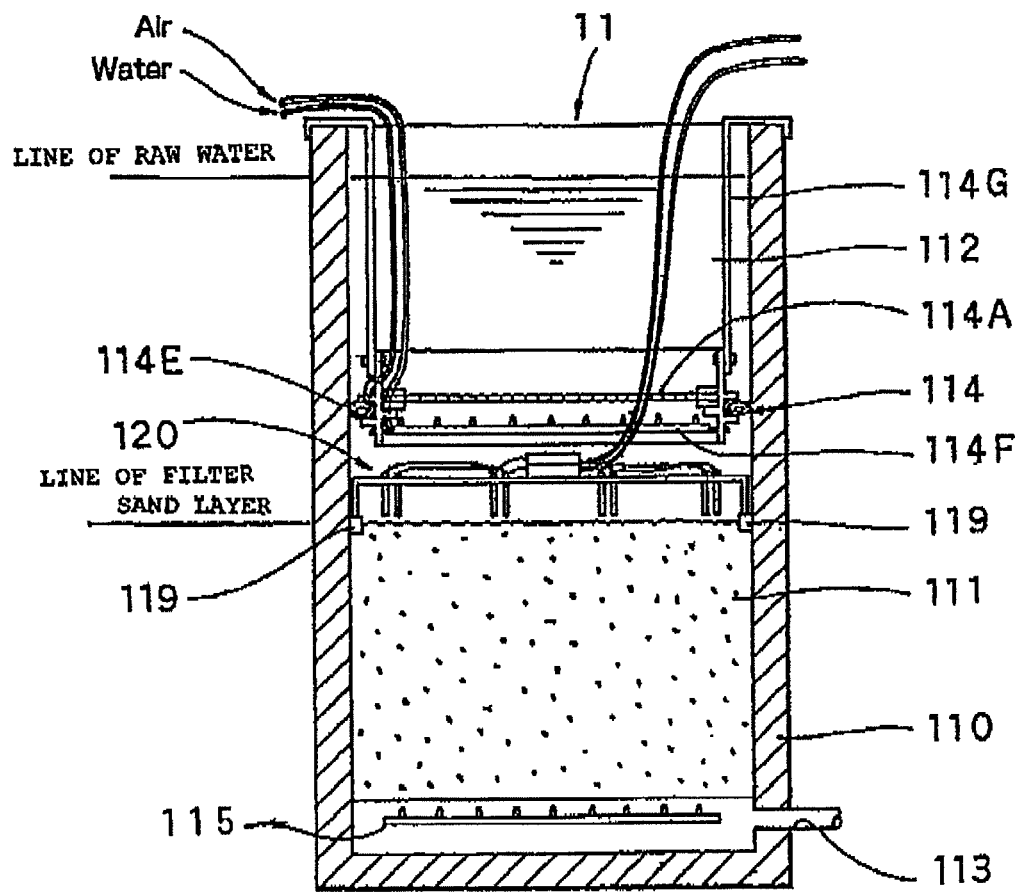
FIG. 5 is a view showing the entire structure of a biological treatment and filtration system equipment according to a second embodiment of the invention.
Figure 6:
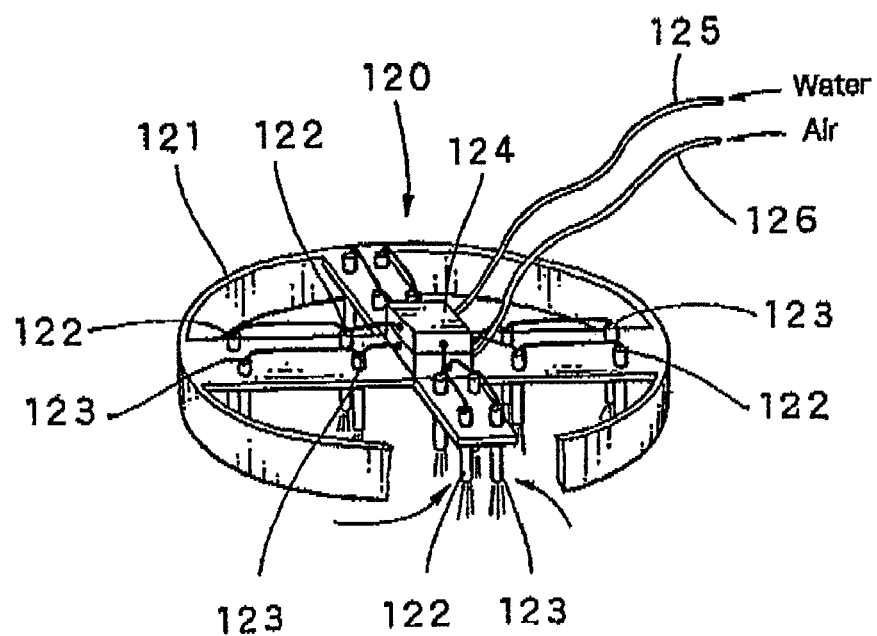
FIG. 6 is a schematic perspective view of a filter sand washer having an aeration function of the embodiment.

FIGS. 5 and 6 show a second embodiment. This embodiment is different from the first embodiment in that a filter sand washer 120 having an aeration function is provided between the filter sand layer 111 and the filtering net 114 in the vessel 110.

The filter sand washer 120 having an aeration function includes a circular holder 121, and the holder 121 is mounted on supporting members 119 fixed to an inner wall of the vessel 110. A plurality of washing nozzles 122 and a plurality of air nozzles 123 are arranged lengthwise and crosswise on the holder 121, and are fixed to the holder to face the lower side. The washing nozzles 122 and the air nozzles 123 are connected by water-supply hoses and air hoses.

The water-supply hoses and the air hoses are connected to a manifold junction 124, and a water-supply hose 125 and an air hose 126 are connected to the manifold junction 124.

In this embodiment, the filter sand washer 120 having an aeration function is provided on the lower side of the filtering net 114, the raw water is treated by microorganisms attached to the surface of the filter sand layer 111, and impurities are filtered when the raw water passes through the filter sand layer 111, so that biological treatment and filtration treatment is performed. Therefore, if sludge is attached to the surface of the filter sand layer 111, water is supplied from the water-supply hose 125 and air is supplied from the air hose 126.

For this reason, the sludge attached to the surface of the filter sand layer 111 is flipped off, and air is sprayed from the air nozzle so that aeration is performed on the microorganisms of the filter sand layer 111. Accordingly, microorganisms are developed. Therefore, the decomposition of the sludge is promoted, so that the sludge is decreased. As a result, it is possible to maintain excellent treatment performance of the biological treatment and filtration system equipment for a long time.

Further, while biological treatment and filtration treatment is performed, aeration may be performed on the microorganisms of the filter sand layer 111 at appropriate intervals so that microorganisms are activated.

INDUSTRIAL APPLICABILITY

According to the invention, when raw water gathered from a river or under the ground is purified to make drinking water, it is possible to reliably remove most of materials harmful to the human body and arsenic components not capable of being removed until now, which are contained in the raw water, by a series of purification operations. Therefore, the practical value thereof is high.

What is claimed is:

1. A biological treatment and filtration system equipment for raw water, which comprises 1) a water treating vessel provided with a raw water inlet and a treated water outlet; 2) a filter sand layer provided between the inlet and the outlet in the vessel for filtering and biologically treating the raw water using a sand layer containing at least minute sintered sand particles carrying microorganisms; 3) a filtering net provided on the top of said filter sand layer, comprising a net body carrying absorbent for absorbing arsenic components contained in the raw water and a frame fixed to the periphery of the net body, wherein a tube ring is engaged on the periphery of the frame of filtering net in a manner to bulge out by a pressure fluid supplied thereto until contacting to a inner surface of the vessel to make a sealing off between the frame and the inner surface, and wherein the raw water inlet is disposed above the filtering net and the treated water outlet is disposed below the filter sand layer.

2. The biological treatment and filtration system equipment for raw water according to claim 1, wherein the net body is made of minute mesh net.

3. The biological treatment and filtration system equipment for raw water according to claim 2, wherein the net body is made of stainless steel wire screen having a mesh in a range of 0.053 mm to 0.283 mm.

4. The biological treatment and filtration system equipment for raw water according to claim 1, wherein the absorbent contains a manganese oxide able to absorb arsenic components and other harmful materials to the human body.

5. The biological treatment and filtration system equipment for raw water according to claim 1, wherein said filtering net is suspended from a top periphery end of the vessel by means of an attachment bracket.

6. The biological treatment and filtration system equipment for raw water according to claim 1, wherein said filter sand layer comprises a first layer comprising very minute sintered sands having an average diameter in a range of 0.08-0.3 mm, a second layer comprising sintered sand having an average diameter in a range of 0.4-1.8 mm, and a third layer comprising ballasts and cobble stone having an average diameter in a range of 2-20 mm.

7. The biological treatment and filtration system equipment for raw water according to claim 1, further comprising a filter sand washer for spraying water, the filter sand washer comprising a holder and a washer nozzle fixed to said holder, the filter sand washer is further provided between the filter sand layer and the filtering net.

8. The biological treatment and filtration system equipment for raw water according to claim 1, wherein an aeration device comprising a holder and an air nozzle fixed to the holder, the aeration device is further provided between the filter sand layer and the filtering net to discharge air to microorganisms carried in the filter sand layer.

9. The biological treatment and filtration system equipment for raw water according to claim 8, further comprising a plurality of air nozzles arranged lengthwise and crosswise on the holder.

* * * * *